INVENTOR:
ROBERT E. KLEMM,
By Hood, Gust & Irish
ATTORNEYS 3,479,488
COOKING APPARATUS
Robert E. Klemm, 2504 Silverleaf Drive,
Fort Wayne, Ind. 46806
Filed July 6, 1967, Ser. No. 651,543
Int. Cl. H05b 3/06; F27d 11/00
U.S. Cl. 219—536                              3 Claims

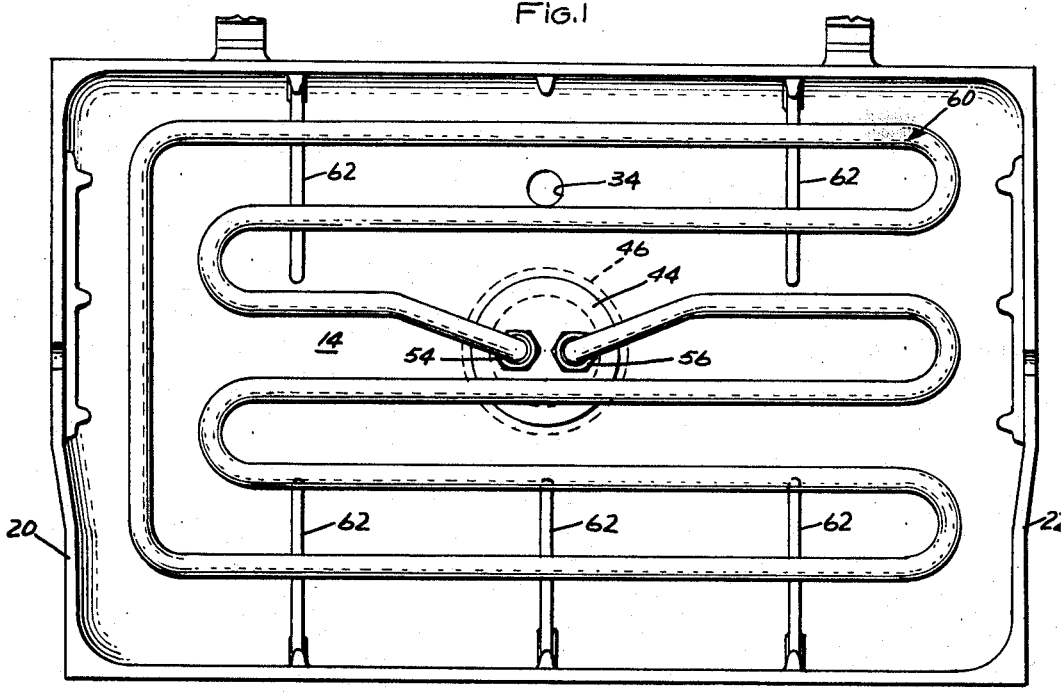
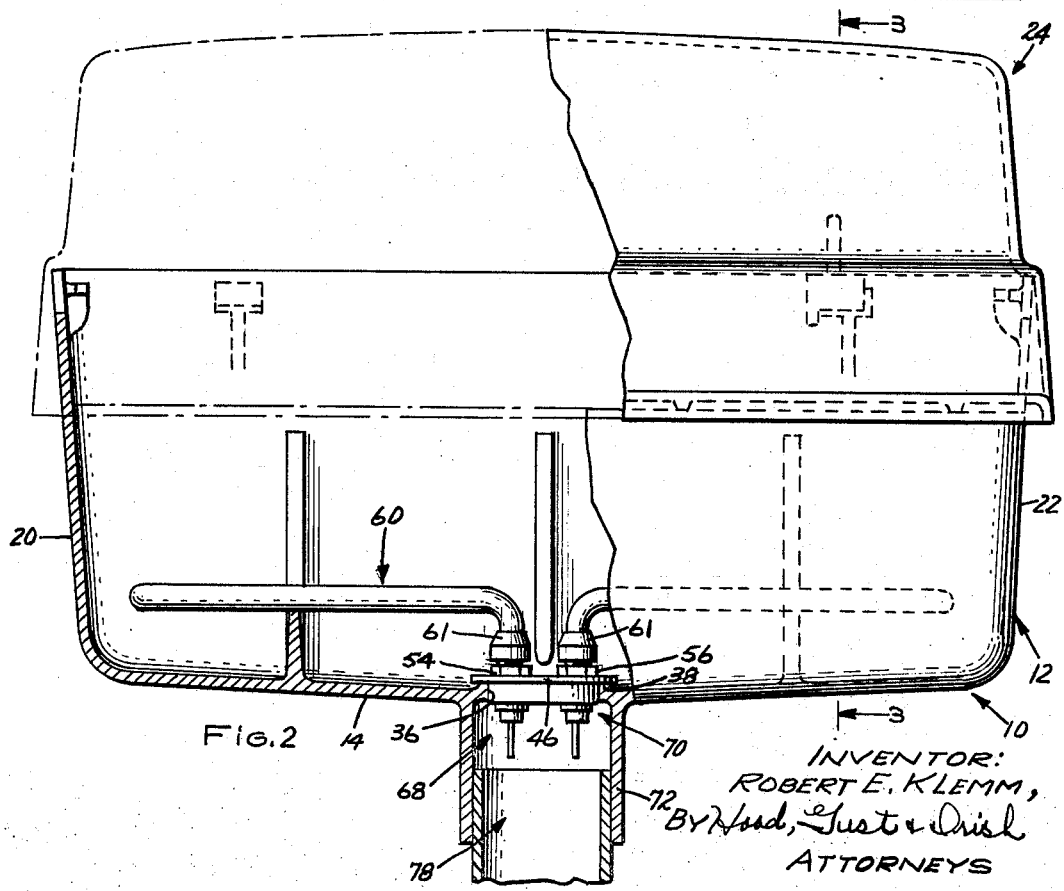

ABSTRACT OF THE DISCLOSURE

A cooking apparatus comprising a pan-shaped base having an opening in its bottom, a plug received in the opening and held above the top surface of the bottom, the plug being provided with a pair of threaded openings, and a hollow screw received in each of the threaded openings. An electric heating element is carried in the base, one end of the element being received in one hollow screw and the other end of the element being received in the other screw. Each screw is arranged as a part of a compressive fitting so that, when it is threaded its respective threaded opening and the fitting is properly assembled, a weather-tight seal is provided between the screw and the end of the heating element received therein. In addition, the plug is welded or otherwise secured to the base to provide a weather-tight seal between the plug and the base.

Background of the invention

*Field of the invention.*—The present invention relates generally to cooking apparatus, and more particularly to the provision of an electrically heated cooking apparatus which is usable out-of-doors and which may be left out-of-doors regardless of the prevailing weather condition.

*Description of the prior art.*—Prior art electrical cookers of the type disclosed herein often fail, because moisture can get to the connections at the end of the heating elements, thereby causing corrosion which is detrimental to the connection.

Summary of the invention

The cooking apparatus of the present invention comprises a pan-shaped base having an opening in its bottom which receives the ends of the electric heating element which is carried in the base. Specifically, the base is formed with an up-turned lip extending peripherally about the opening and providing a seat which is above the top surface of the bottom of the base in the area surrounding the opening. A plug having a laterally and peripherally extending flange arranged to rest on the seat is received in the opening, the flange being secured to the seat to provide a weather-tight seal between the plug and the bottom of the base. A pair of hollow screws are threadedly engaged in openings in the plug. One end of the heating element is received in one screw and the other end of the heating element is received in the other screw. The screws are arranged as parts of compressive fittings so that, when they are threaded into their respective openings and the fittings are properly assembled, a weather-tight seal is provided between each end of the heating element and the base.

In the preferred form of this invention, the base is formed to provide a tubular portion depending from the bottom, the tubular portion being disposed about the opening which receives the plug so that the ends of the heating element extending downwardly from the bottom are protected. The tubular portion also provides an ideal means for mounting the base on a support post.

By providing a drain opening in the bottom of the base at a level which is lower than the level of the plug which penetrates the bottom and which carries the screws, liquid falling into the base cannot reach the level of the connections between the ends of the heating element and the screws.

It is an object of the present invention, therefore, to provide means for connecting the ends of an electric heating element in an outdoor-type cooking apparatus so that the ends are sealed against the penetration of moisture.

Another object of the present invention is to provide such a connecting means comprising a pair of screws threadedly engaged in a plug which is raised above the bottom of the base of the cooker, each of the screws being arranged to effect a weather-tight seal between one end of the heating element and the screw.

Still another object of the present invention is to provide on the base of the cooker a depending tubular element which is arranged to receive the downwardly extending ends of the heating element to protect the ends of the heating element and to provide means for mounting the base on a support post.

Brief description of the drawings

The above-mentioned and other features and objects of this invention and the manner of attaining them will become more apparent and the invention itself will be best understood by reference to the following description of an embodiment of the invention taken in conjunction with the accompanying drawings wherein:

FIG. 1 is a top view of the pan-shaped base of the cooking apparatus of the present invention;

FIG. 2 is a partially cut-away and partially sectioned front view of the cooking apparatus of the present invention showing the manner in which the ends of the electric heating element penetrate the bottom of the base;

Description of the preferred embodiment

Figure 3:
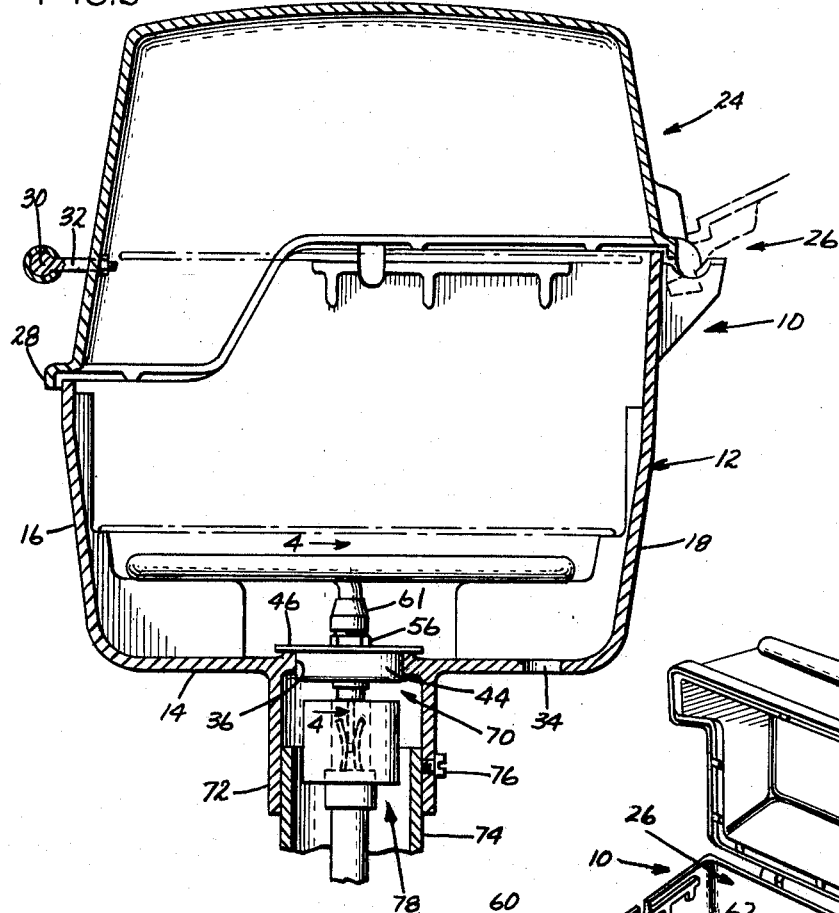
FIG. 3 is a sectional view taken substantially along section line 3—3 of FIG. 2.
Figure 5:
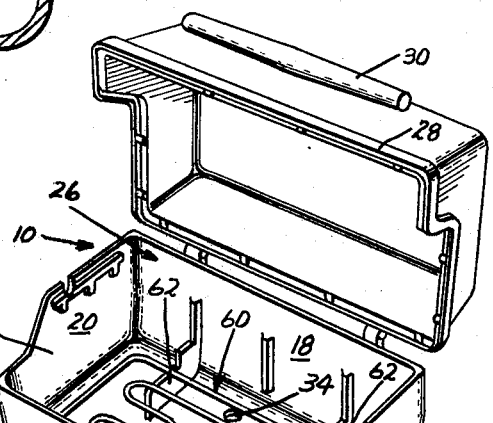
FIG. 5 is a perspective view of the cooking apparatus.

Referring to the drawings, it will be seen that the cooking apparatus of the present invention, indicated generally by the reference number 10, comprises a pan-shaped base 12 having a bottom 14, front and back walls 16 and 18, respectively, and side walls 20 and 22. A top cover, indicated generally by the reference numeral 24, is hingedly connected to the base 12, the hinge connections between the base 12 and the top cover 24 being indicated generally by the reference numeral 26. The top cover 24 is provided with an outwardly and downwardly turned lip 28 which completely circumscribes the upper edges of the walls 16, 18, 20 and 22, as shown in FIGS. 2 and 3, to prevent rain from falling into the interior of the base 12. The top cover 24 is also provided with a decorative wood handle 30 which is separated from the cover 24 by stand-offs 32 and which may be used safely to lift the top cover 24.

In a preferred embodiment of the present invention, the base 12 and top cover 24 are cast in the illustrated forms from cooking-quality aluminum alloy and the outer surfaces of the base 12 and top cover 24 are finished with a heat-resistant paint. Preferably, the inner surfaces of the aluminum castings (case 12 and top cover 24) are left unpainted so that the natural finish of the aluminum will facilitate the transfer of heat to items being cooked in the apparatus 10. It will be apparent, however, that the base 12 and the top cover 24 may be cast from other metals such as iron and steel.

Referring to FIG. 2, it will be seen that the bottom 14 of the base 12 is formed so that meat juices and other liquids falling on the top surface of the bottom 14 will drain toward the center of the bottom 14, and referring to FIG. 1, it will be seen that a drain hole 34 is provided in the bottom 14. Thus, if the top cover 24 is left open during a rain or if the base 12 is cleaned with a garden hose, the water collected in the base 12 will drain out through the opening 34.

The bottom 14 is also provided with a centrally-located opening 36 having an up-turned lip 38 extending peripherally thereabout, the lip 38 providing a seat 40 which is above the top surface 42 (FIG. 4) of the bottom 14 in the area surrounding the opening 36. A plug 44 having a laterally and peripherally extending flange 46 arranged to rest on the seat 40 is received in the opening 36 as clearly shown in FIG. 4. Preferably, the flange 46 is welded about its periphery to the seat 40, as indicated by the reference numeral 48, so that a weather-tight seal is provided between the plug 44 and the bottom 14 of the base 12.

It will be apparent from the above description that, since the flange 46 is resting on the seat 40 which is above the level of the surface 42 and since the juncture, indicated by the reference number 48, between the flange and the seat 40 is welded and since the drain opening 34 is provided, meat juices and the like falling into the base 12 will not flow up over the top surface of the flange 46. However, in the operation of the apparatus, the meat juices are either burned up or vaporized upon contact with the heating elements or artificial charcoal pieces (made of metal or the like) placed on the heating elements. The plug 44 is provided with a pair of threaded openings 50, 52 in which is received hollow screws 54, 56, each screw being provided with an axially extending bore 58 and being threaded at both ends as shown.

Figure 4:
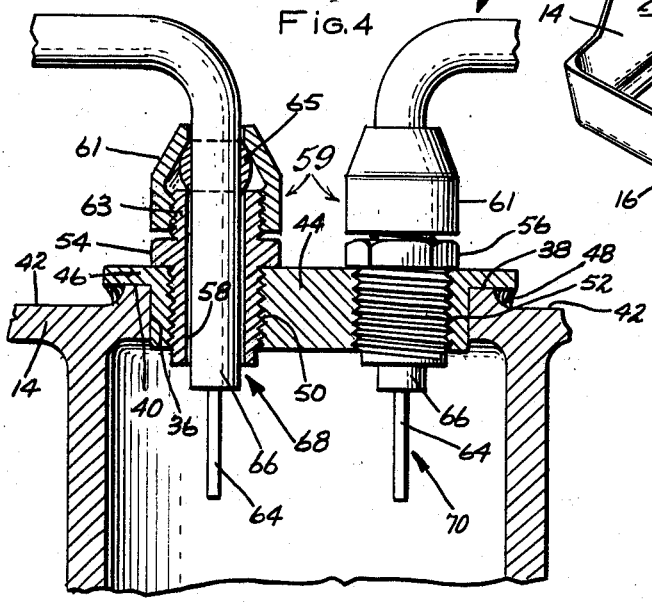
FIG. 4 is an enlarged, fragmentary sectional view taken from FIG. 3 generally along the line 4—4 and showing the hollow screws which receive the ends of the electric heating element.

Disposed within the base 12 is an electric heating element 60 which may be supported on ribs 62 formed on the bottom 14. The heating element 60 is preferably of the type having a resistive wire or strip 64 enclosed in an electrically-insulative sheath 66 (FIG. 4). A suitable sheath material is Incolony.

Referring specifically to FIG. 4, it will be seen that one end, indicated by the reference numeral 68, of the heating element 60 extends through the bore 58 of the screw 54 and the other end, indicated generally by the reference numeral 70, extends through the bore 58 of the screw 56. Each screw 54, 56 is part of a compression fitting 59 arranged so that, when the screw is threaded into its respective opening 50, 52, and the fitting 59 properly assembled, the end 68, 70 of the heating element 60 will be held within the bore 58 of the screw in a rigid, weather-tight manner. The fitting 59 includes a gland nut 61 threaded on to the upper end 63 of the screw 54, and a metallic squeeze ring 65 fitted between the screw 54 and the nut 61. As the nut 61 is tightened, the ring 65 is wedged into a slight annular clearance between the sheath 66 and the screw end 63, the upper portion of the nut 61 engaging and forcing the ring 65 downwardly. The sheath 66 is thereby rigidly secured to the bottom 14 as well as being hermetically sealed with respect thereto, the ring 65 and nut 61 providing a seal between the bore 58 and the sheath 66. The screw 54 provides a seal between the opening 50 and the bottom 14.

The base 12 is formed with a depending tubular portion 72 which is arranged to surround the opening 36 and to protect the ends 68 and 70 of the heating element 60. The tubular portion 72 also provides an ideal means for mounting the cooking apparatus 10 on a support post, such as the post indicated by the reference numeral 74. Referring to FIGS. 2 and 3, it will be seen that the tubular portion 72 fits down over the upper end of the support post 74 and that a set screw 76 penetrates the tubular portion 72 to engage the upper end of the support post 74, thereby to fasten the base 12 to the support post.

A connector, shown in phantom and indicated by the reference number 78, which is entirely contained within the space defined by the tubular portion 72, is provided for connecting the ends 68 and 70 of the heating element 60 to an electrical power source, not shown. It will be apparent, therefore, that the space within the tubular portion 72 and under the plug 44 is sealed against moisture penetration from the inside of the base 12. It will also be apparent that the ends 68 and 70 of the heating element 60 and the connector 78 are well protected from the weather.

The present invention is the ultimate in simplicity, is durable and has long-term reliability in operation. By arranging the heating coils 60 in a substantially horizontal plane and projecting the terminal ends 66 thereof downwardly through the bottom of the base 12 in a direction away from the element 16, it will be seen that these terminal ends 66 are isolated from the heat developed inside the base 12. This is to be constrasted with projecting the terminal ends of the heating element laterally through the sides of the base or even upwardly, where they are subjected to substantially the entire heat output of the heating element or at least the heat contained within the base 12. In this invention, since the ends 66 project downwardly and directly through the bottom of the base 12, they occupy a position least affected by the heat. Furthermore, the ends 66 are positioned for convenient connection to external wiring, this connection also being isolated efficiently and effectively from the developed heat. By positioning the terminal ends in the center of the base 12, it is furthermore possible to utilize a depending, hollow supporting stub 72 which not only shields the electrical connecting parts, but also serves as a support for the total unit. All of the wiring can then be passed through the hollow supporting post 74 for convenient connection to external circuitry.

The positioning of the terminal ends 66 in the bottom of the base 12 additionally facilitates the weather-tight sealing of the heating units, both where they pass through the base 12 itself and also within the supporting post 72 structure.

While there have been discussed above the principles of this invention in connection with specific apparatus, it is to be clearly understood that this description is made by way of example and not as a limitation to the scope of the invention.

What is claimed is:

1. A cooking apparatus comprising a base having a bottom and an opening extending through said bottom, a sheathed electric heating element carried by said base and having two terminal ends, said base being pan-shaped, an up-turned lip extending peripherally about said opening and providing a seat which is above the top surface of the bottom of the base in the area surrounding said opening, a plug received in said opening, said plug having a laterally and peripherally extending flange arranged to rest on said seat, said flange secured to said seat to provide a weather-tight seal between said plug and the bottom of said base, said plug being provided with first and second threaded openings extending through said plug, two hollow screws threadedly received by said first and second threaded openings, respectively, each of said screws having an axially extending bore, one end of said heating element extending downwardly through the bore in one of said screws and the other end of said heating element extending downwardly through the bore in the other of said screws, means including each of said screws for receiving said ends of said heating element in weather-tight sealing relationship, said sheathed electric heating element disposed in said base and spaced above said bottom, said means including a gland nut surrounding each sheath and threaded on to each respective screw, and a squeeze ring surrounding each sheath and being compressed into sealing relation between the sheath and the respective screw by the respective nut.

2. A cooking apparatus as in claim 1 wherein said base is formed to provide a tubular portion depending from said bottom, said tubular portion being disposed about said opening to enclose the ends of said heating element, said tubular portion thereby providing means for supporting said base and protecting the ends of said heating element.

3. A cooking apparatus as in claim 1 wherein said base is provided with a drain opening in the bottom, said drain opening being positioned in said bottom at a level lower than the level of said flange on said plug, ribs on said bottom and said heating element including coils arranged substantially horizontally with the terminal end portions thereof extending vertically downwardly and said ribs supporting said coils in elevated position above said bottom.

References Cited
UNITED STATES PATENTS

| | | | |
|---|---|---|---|
| 2,399,423 | 4/1946 | Bletz | 219—449 X |
| 2,550,843 | 5/1951 | McOrlly | 219—461 X |
| 2,586,950 | 2/1952 | Hynes | 285—341 |
| 2,816,538 | 12/1957 | Miller et al. | 99—447 X |
| 2,860,226 | 11/1958 | Williams et al. | 219—318 X |
| 2,911,512 | 11/1959 | Williams | 219—341 X |
| 3,187,161 | 6/1965 | Finn | 219—437 X |
| 3,298,361 | 1/1967 | Clark | 126—25 |

JOSEPH V. TRUHE, Primary Examiner

M. C. FLIESLER, Assistant Examiner

U.S. Cl. X.R.

99—446; 219—336, 437, 438, 467